(12) United States Patent
Pahlke et al.

(10) Patent No.: US 6,748,680 B2
(45) Date of Patent: Jun. 15, 2004

(54) THERMALLY CONTROLLED APPARATUS FOR ACTUATING A VALVE OPENING, IN PARTICULAR A FLUID VALVE

(75) Inventors: Lutz Pahlke, Nuremberg (DE); Stefan Trapp, Nuremberg (DE)

(73) Assignee: Intercontrol Hermann Kohler Elektrik GmbH & Co. KG, Nuremberg (DE)

( * ) Notice: Subject to any disclaimer, the term of this patent is extended or adjusted under 35 U.S.C. 154(b) by 66 days.

(21) Appl. No.: 10/072,105

(22) Filed: Feb. 8, 2002

(65) Prior Publication Data
US 2002/0108263 A1 Aug. 15, 2002

(30) Foreign Application Priority Data
Feb. 10, 2001 (DE) .......................................... 101 06 141

(51) Int. Cl.[7] ................................................ D06F 75/14
(52) U.S. Cl. ...................................................... 38/77.8
(58) Field of Search ................................ 38/77.8, 77.7, 38/74, 75, 77.83, 77.9, 82; 219/251, 252, 253; 137/75, 251.1, 252, 334, 457, 468, 910; 251/4, 7, 334

(56) References Cited

U.S. PATENT DOCUMENTS

| | | | | | |
|---|---|---|---|---|---|
| 4,032,071 A | * | 6/1977 | Imoto | ...................... | 236/101 E |
| 4,837,952 A | * | 6/1989 | Hennuy et al. | .............. | 38/77.7 |
| 5,039,843 A | * | 8/1991 | Muller | ........................ | 219/511 |
| 5,078,361 A | * | 1/1992 | Nordman | ........................ | 251/7 |
| 5,810,324 A | * | 9/1998 | Eriksson et al. | ................ | 251/7 |
| 6,167,643 B1 | * | 1/2001 | Dodier et al. | ................. | 38/77.8 |

FOREIGN PATENT DOCUMENTS

DE  196 42 102 C1  3/1998

* cited by examiner

Primary Examiner—Ismael Izaguirre
(74) Attorney, Agent, or Firm—Merchant & Gould, P.C.

(57) ABSTRACT

Thermally controlled apparatus 1 for actuating a valve opening 2, in particular a fluid valve, in particular a drip-stop valve in a steam iron, the apparatus having a bimetallic spring disc 3 fastened to a carrier element 4, the edge 5 or edge region of which disc opens or closes the valve opening depending on the curvature position of the bimetallic spring disc 3. The valve opening is formed through a cross-sectionally variable segment 6 of a tube- or pipe-like flow-through element 7, and the edge 5 or edge region of the bimetallic spring disc 3 acts directly on the cross-sectionally variable segment 6.

38 Claims, 8 Drawing Sheets

THERMALLY CONTROLLED APPARATUS FOR ACTUATING A VALVE OPENING, IN PARTICULAR A FLUID VALVE

TECHNICAL FIELD

The invention relates to a thermally controlled apparatus for actuating a valve opening. In particular, the field of fluid valves is addressed, and here specifically the so-called drip-stop valves, such as find application in steam irons. The thermally controlled apparatus displays a bimetallic spring (snap-action) disc that upon reaching a transition temperature changes its curvature position and in the process closes or opens a valve opening with its disc edge or edge region.

BACKGROUND

Such a device is know from DE 196 45 102 C1. There, a bimetallic spring disc, which is fastened to a carrier element, acts on a closing fixture of a valve, in conjunction with a transfer lever arranged on the spring disc. This known thermally controlled apparatus has indeed proved to be reliable and functional, but is disadvantageous with respect to its installation and adjustment in interaction with additional valve elements.

SUMMARY

The invention is based on the task of devising a thermally controlled apparatus for actuating a valve opening such that the apparatus has only a few functional parts, leads to a secure closing of the valve, and can be installed in a simple manner. This task is accomplished through the characterizing features of patent claim 1. Advantageous further developments of the invention result from the dependent claims 2–38.

The invention provides for the fact that the valve opening is formed through a cross-sectionally variable segment of a tube- or pipe-like flow-through element, and the edge or edge region of the bimetallic spring disc acts directly on the cross-sectionally variable segment.

Thus, in an advantageous manner the apparatus makes do without additional intermediate elements, whereby the number of functional parts is reduced. In principle, it is possible for the apparatus to consist of only three parts, namely the bimetallic spring disc, the carrier element, and the flow-through element. If the bimetallic spring disc has a circular design, and the tubular or pipe-like flow-through element cuts the circular surface, then a double closing is advantageously formed in the edge region of the bimetal disc, whereby an especially high degree of valve tightness is ensured.

In an advantageous manner, as the flow-through element a permanently elastic tube or a permanently elastic molded part can be used, for example a soft silicone hose, which is compressible in a cross-sectionally variable manner by the available forces of the bimetallic spring disc. The flow-through element runs between the bimetallic spring disc and the carrier element, so that the carrier element has multiple functions, namely, a supporting function with respect to the flow-through element and the bimetallic spring disc, and a counterpressure function, since the flow-through element, when compressed by the bimetallic spring disc, can support itself against the carrier element.

The carrier element consists advantageously of a carrier plate that runs essentially parallel to the extension plane of the bimetallic spring disc. The carrier plate serves additionally the conduction of heat into the bimetallic spring disc. Moreover, a plate-shaped element can be easily fastened, for example in the interior of the sole of an iron, when the apparatus is to perform the function of a drip-stop valve. In that case, the center of the bimetallic spring disc is attached to the carrier plate, which in the fastening region has a somewhat elevated design.

The fastening of the carrier plate, e.g. to the sole of a steam iron, can take place by means of a rivet or bolt, which passes through the center of the carrier plate as well as the bimetallic spring disc, and engages the top side of the sole.

The carrier element can be embodied separately or be integrated into the top side of the sole of the iron or of a steam chamber, so that the thermally controlled apparatus is reliably stabilized in its position. Appropriately, the top side of the sole of an iron or of a steam chamber can be designed as a carrier element, whereby the number of functional parts is reduced still further.

The bimetallic spring disc is, in most cases, a punched part, so that it has one burred and one burr-free side; appropriately, the burr-free side can act on the flow-through element. In this way, the flow-through element is prevented from being acted on only according to a linear pattern and being stressed too greatly at this location.

In order to increase the tightness of the closing, the carrier element can display protruding ribs that act directly on the cross-sectionally variable segment of the flow-through element. When the bimetallic spring disc assumes an appropriate position, a flat impacting of the top side of the tube by the underside of the bimetallic spring disc occurs, so that the tube is pressed onto the closing ribs, which protrude upward from below against the tube. In order to achieve a clean and durable closing, the ribs of the bimetallic spring disc can be arranged essentially parallel to the edge of the bimetallic spring disc acting on the flow-through element. In addition, the ribs can follow the edge course of the bimetallic spring disc and thereby, in an advantageous manner, increase the closing effect of the edge of the bimetallic spring disc.

Further, the ribs can be displaced radially inward with respect to the edge of the bimetallic spring disc, in order to ensure a flat impacting in an optimal manner.

In an advantageous embodiment variant, the flow-through element, at least in the region of the cross-sectionally variable segment, can enter the top side of the sole of the iron or of the steam chamber. The flow-through element is thereby protected from external, e.g. thermal or mechanical, effects. Advantageously, the flow-through element, at least in the region of the cross-sectionally variable segment, lies in a tube guide element, which, for example, is designed as a trough-like indentation or recess or notching. Through this structural measure, the flow-through element cannot shift laterally under the disc and remains stabilized in its position.

In addition, this tube guide element can display at least one rib for direct impacting of the cross-sectionally variable segment of the flow-through element. These closing ribs are also advantageously arranged such that a linear closing from below is ensured.

In a further advantageous embodiment variant, the carrier element has a transition element into which the flow-through element transitions. For this purpose, for example, the carrier plate or carrier element can be designed as a plastic molded part that is provided with a brace that extends into the steam chamber, which brace then transitions into the tube or is formed as one piece with a segment of the tube.

The carrier element is bent around the edge of the bimetallic spring disc, in particular bent in an angular manner, so that the flow-through element, in particular the tube between the central fastening region of the bimetallic spring disc to the carrier element and the bent section of the carrier element, is supported and cannot unintentionally move away from the impingement region of the bimetallic spring disc.

The edge region of the bimetallic spring disc adjacent to the flow-through element is supported by an additional bending up of the carrier element, through which result especially favorable force relationships for exertion on the flow-through element. The bend-up height corresponds approximately to the thickness of the flow-through element compressed by the edge of the bimetallic spring disc. The height of the bent-up section is determined essentially by the spring characteristic of the bimetallic spring disc.

With particular advantage, the carrier element can be designed in a springing manner such that it follows the movement of the bimetallic spring disc over a certain spring distance. By this means, the closing movement has a longer stroke. In addition, too-high pressing forces on the delicate silicone tubing are cushioned or dampened. Moreover, such a long-stroke element is more easily adjusted.

The elevated central region of the carrier element is formed through a stamping, by which means additional parts can be spared. The center of the stamped region is provided with an integrated bead, which penetrates a central fastening cutout of the bimetallic spring disc, so that a separate attachment element can be dispensed with.

The bimetallic spring disc can be arranged on a heat-conducting carrier element in a directly thermally-coupled manner. In this context, it is possible to design the carrier element as heat-conducting plate. The carrier element can also have a dome-like shape, in which case a support element for the bimetallic spring disc can be designed on the carrier element. The advantage of this consists in the fact that the support element is not heated up much, but rather the flow of heat from the top side of the steam chamber via the dome passes very quickly into the bimetallic spring disc. The dome-like carrier element can bear the support element in, for example, a necking.

The heat-conducting carrier element can also be designed as a carrier bolt or rivet, and in this way be easily produced and assembled with the bimetallic spring disc. For this purpose, the carrier element is advantageously in direct thermal contact with the heated sole or steam chamber, as the case may be, the carrier element penetrating the top side of the sole or steam chamber.

In the opened state, the closing areas of the flow-through element acted on by the bimetallic spring disc have an oval cross section.

DESCRIPTION OF THE DRAWINGS

The invention is explained in detail with the aid of advantageous embodiment examples in the drawn figures. These show.

DETAILED DESCRIPTION

Figure 1:
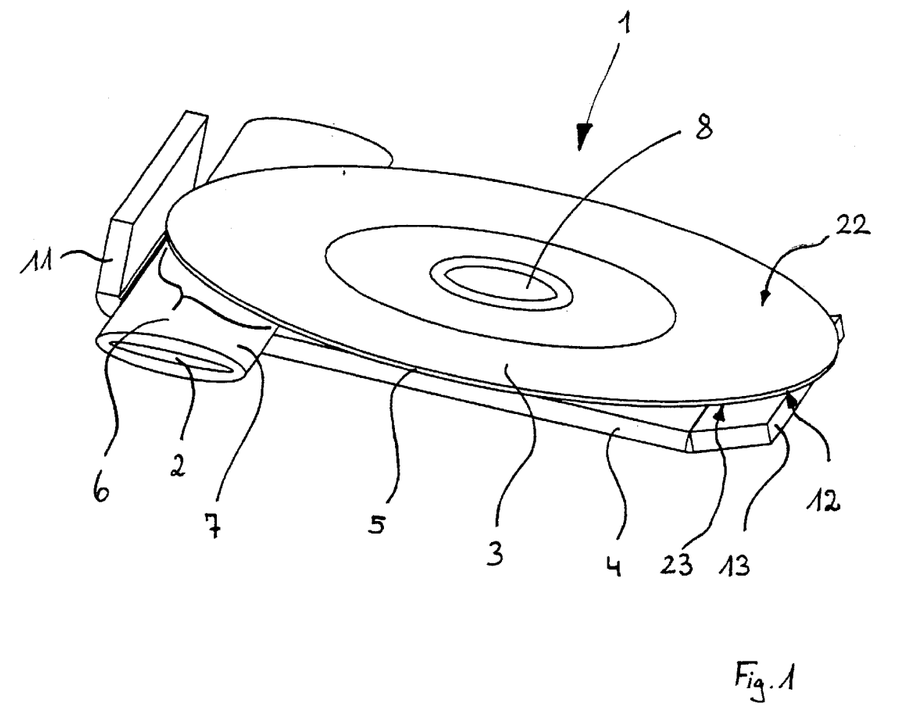
FIG. 1: a perspective view of a thermally controlled apparatus in the opened state
Figure 2:
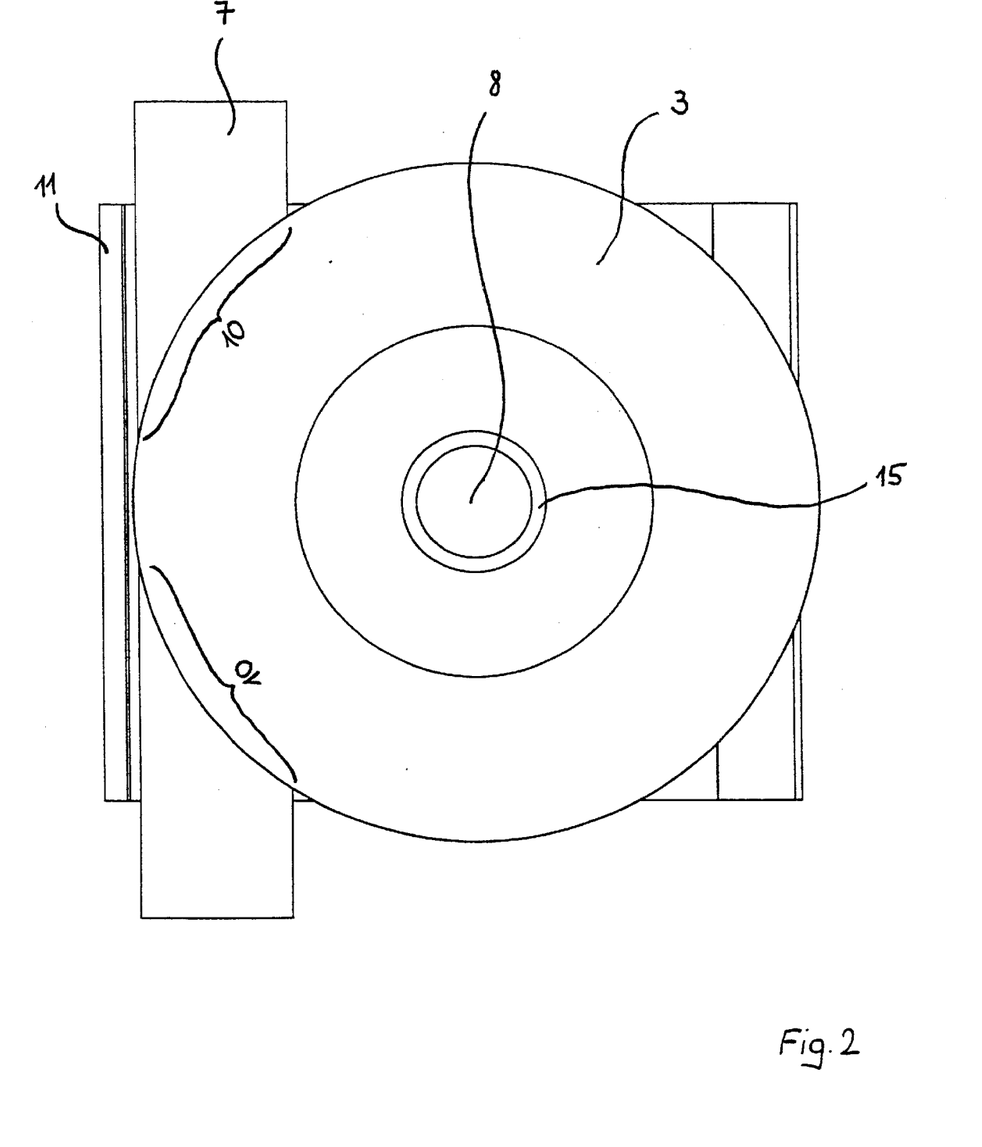
FIG. 2: a plan view of a thermally controlled apparatus according to FIG. 1
Figure 3:
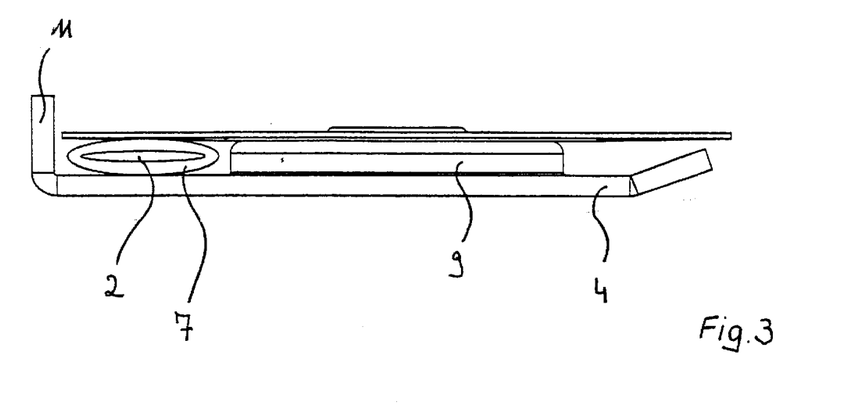
FIG. 3: a side view of an apparatus according to FIG. 1 in the opened state
Figure 4:
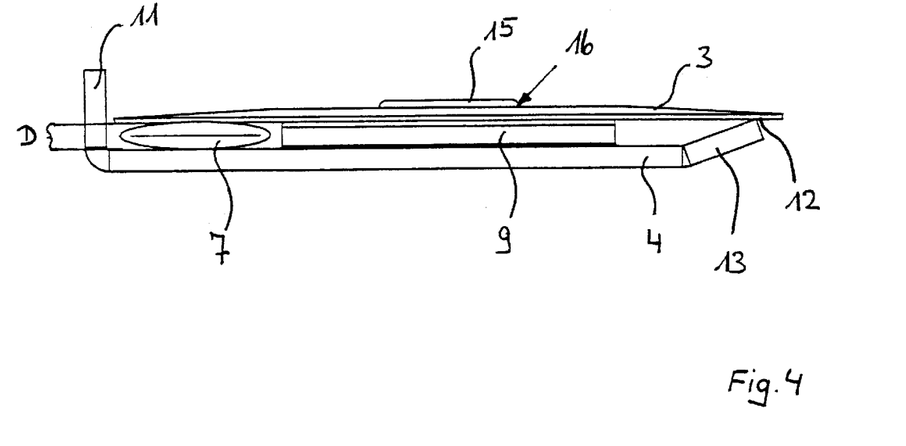
FIG. 4: an apparatus according to FIG. 3 in the closed state

The thermally controlled apparatus 1 for actuating a valve opening 2 displays a bimetallic spring disc 3, which is attached to a carrier element 4 and the disc edge 5 of which opens or closes the valve opening 2 depending of the state of the curvature. The valve opening 2 is formed by a cross-sectionally variable segment 6 of a tube-like flow-through element 7, with the edge 5 of the bimetallic spring disc 3 acting directly on the cross-sectionally variable segment 6. In the case of the represented embodiment example, the flow-through element 7 is a permanently elastic tube, in particular a silicone tube. The flow-through element 7 is clamped between the bimetallic spring disc 3 and the carrier element 4, and the carrier element 4 consists of a carrier plate that extends essentially parallel to the bimetallic spring disc 3. The bimetallic spring disc 3 is attached at its center 8 to the carrier element 4, for which purpose an elevated section 9 is stamped in the carrier element 4.

The bimetallic spring disc 3 is produced as a punched part and therefore displays a burred side 22 as well as an burr-free side 23, the flow-through element being acted on by the burr-free side 23.

The flow-through element 7 is acted on by the edge 5 of the bimetallic spring disc 3 twice, at one area behind the other in the flow-through direction, whereby sequential sealing regions are formed. The acting on the flow-through element 7 by the edge 5 of the bimetallic spring disc 3 takes place along two circular segments 10, as is particularly evident from the plan view according to FIG. 2.

The carrier element 4 is bent around the edge 5 of the bimetallic spring disc 3, and the flow-through element 7 borders on the bend 11 formed in the carrier element 4. The position of the flow-through element relative to the bimetallic spring disc 3 and the carrier element 4 is defined by the bend 11 on the one hand, and the stamped area 9, on the other hand.

The edge region 12, opposite the flow-through element 7, of the bimetallic spring disc 3 is supported by an upward bend 13 of the carrier element 4. The height of this upward bend 13 corresponds approximately to the diameter D of the flow-through element compressed by the edge of the bimetallic spring disc.

The center of the stamped area 9 is provided with an integrated bead 15, which penetrates a central fastening cutout 16 of the bimetallic spring disc 3.

The carrier element 4 can, in an advantageous alternative configuration, be integrated into the top side 18 of the sole 19 of an iron or a steam chamber. As evident in particular in FIGS. 8–13, the top side 18 of the sole 19 of an iron simultaneously represents the carrier element.

Figure 8:
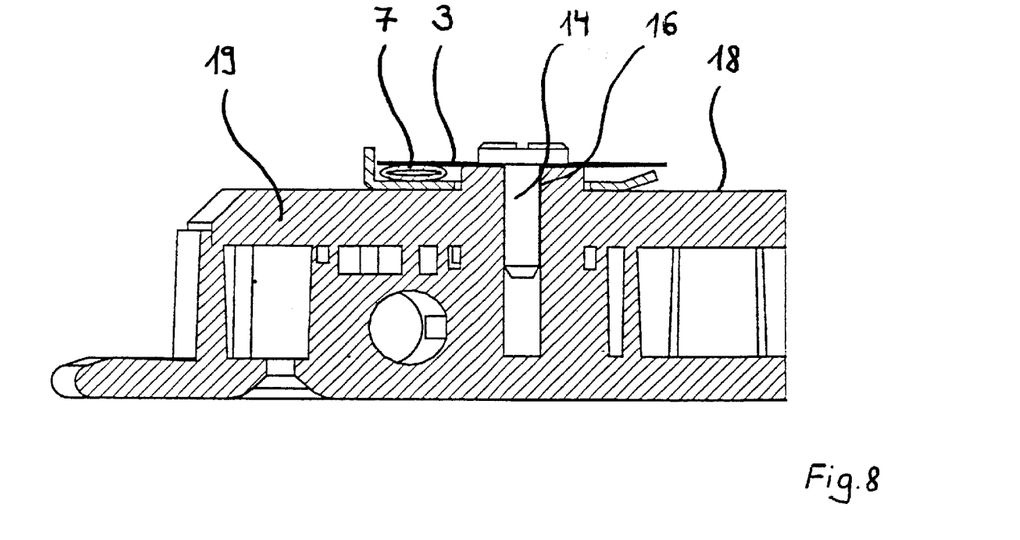
FIG. 8: a side view of a thermally controlled apparatus in the state in which the latter is installed in a sole of an iron and with an opened valve opening
Figure 9:
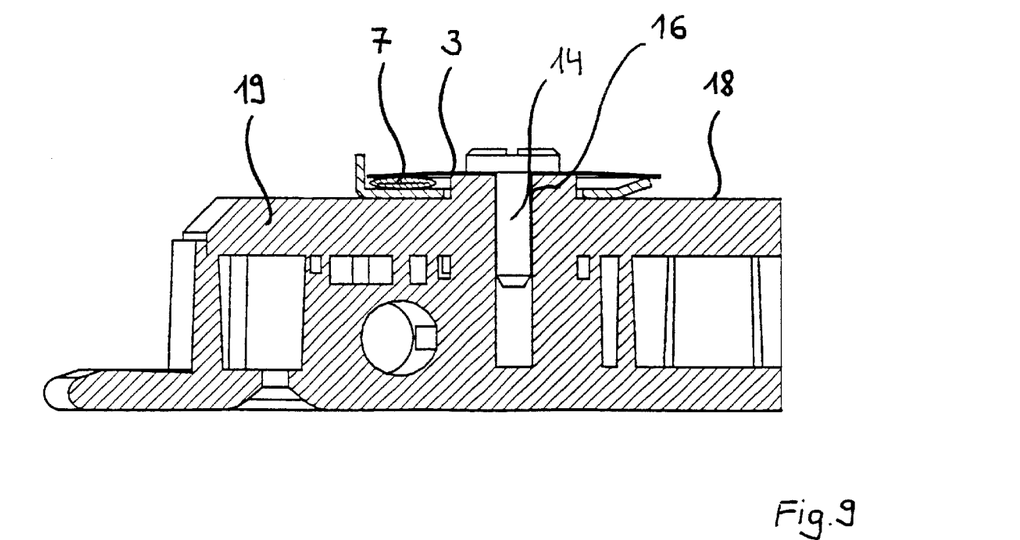
FIG. 9: a side view of the apparatus according to FIG. 8 with a closed valve opening

FIGS. 8 and 9 illustrate a possibility of the fastening of the thermally controlled apparatus 1 by means of a rivet 14 which penetrates the fastening cutout 16 and engages the sole 19 of the iron. The carrier element 4 is at least partially formed by the top side 18 of the sole 19 of the iron.

Figure 5:
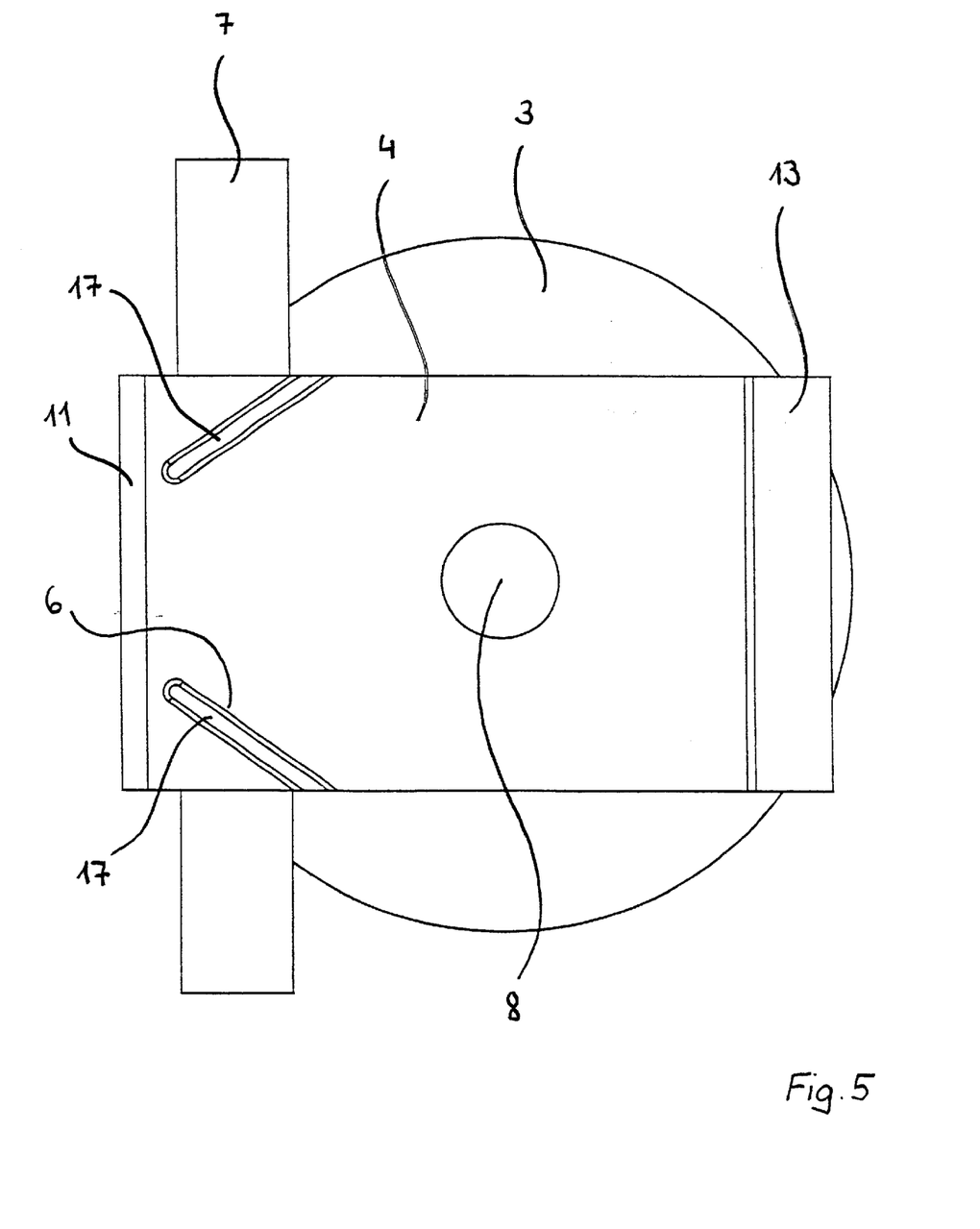
FIG. 5: a bottom view of an alternative embodiment form of a thermally controlled apparatus
Figure 6:
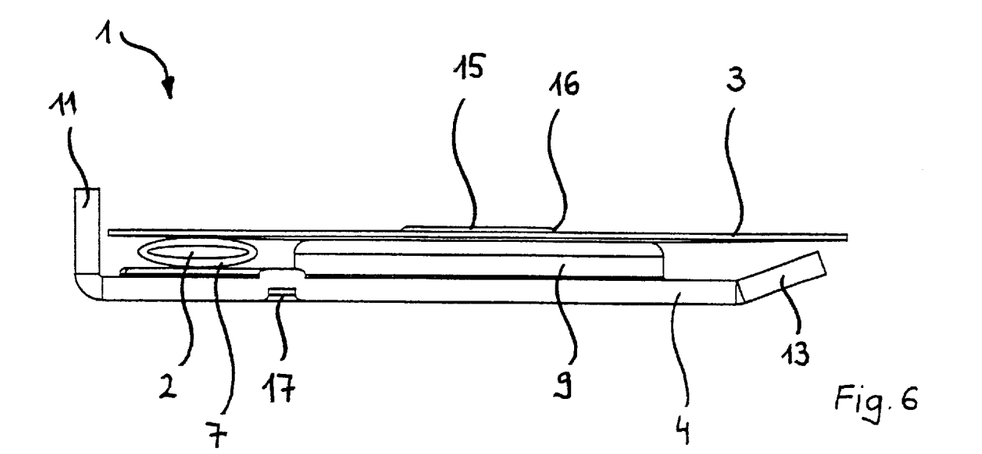
FIG. 6: a side view of the apparatus according to FIG. 5 in the opened state
Figure 7:
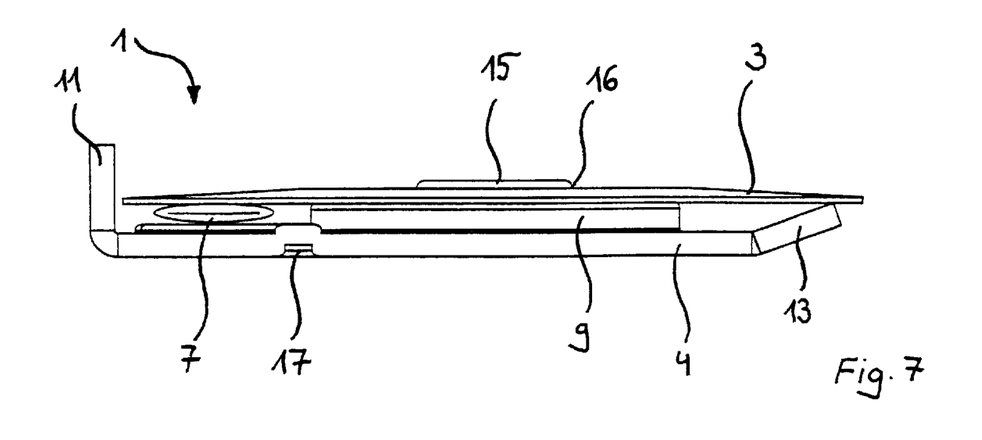
FIG. 7: an apparatus according to FIG. 6 in the closed state

The embodiment variation, represented in FIG. 5, of the thermally controlled apparatus 1 is distinguished by the fact that the carrier element 4 displays protruding ribs 17 for direct action on the cross-sectionally variable segment 6. The ribs 17 are arranged essentially parallel to the edge 5 of the bimetallic spring disc 3 acting on the flow-through element 7. Through the ribs 17 are created two linear seals, which ensure a reliable and durable closing.

Figure 10:
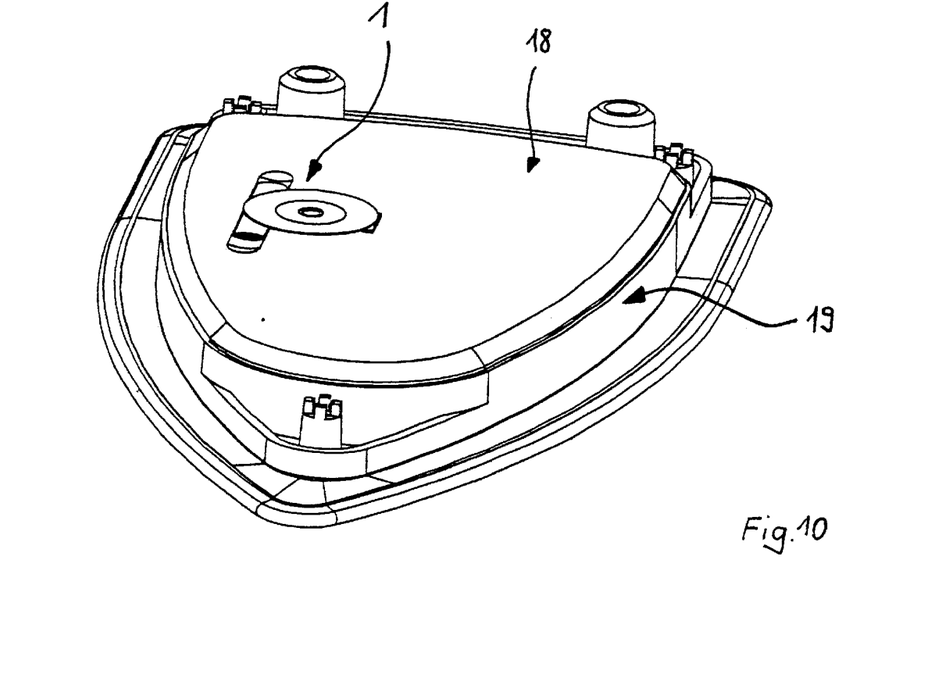
FIG. 10: a perspective representation of a sole of an iron with an integrated, thermally controlled apparatus
Figure 11:
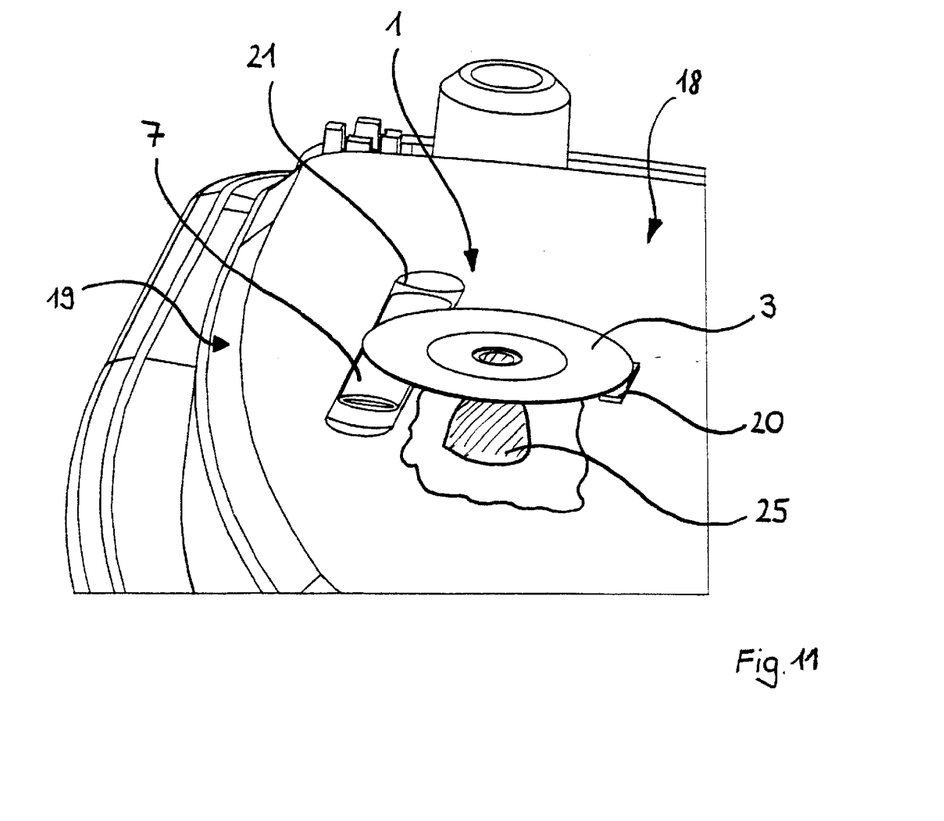
FIG. 11: an enlarged representation of a detail from FIG. 10

Represented in FIGS. 10 and 11 is how the flow-through element 7, at least in the region of the cross-sectionally variable segment 6, enters the top side 18 of the sole 19 of the iron. In this, the flow-through element 7 or the cross-sectionally variable segment 6, as the case may be, lies in a tube guide element 21, which is designed in the manner of a trough. The tube guide element 21 ensures a secure and stable positioning of the flow-through element 7, in particular during actuation of the valve opening 2. Provision is made on the top side 18 of the sole 19 of the iron for a support element 20, which serves to support the edge 5 of the bimetallic spring disc 3.

Figure 12:
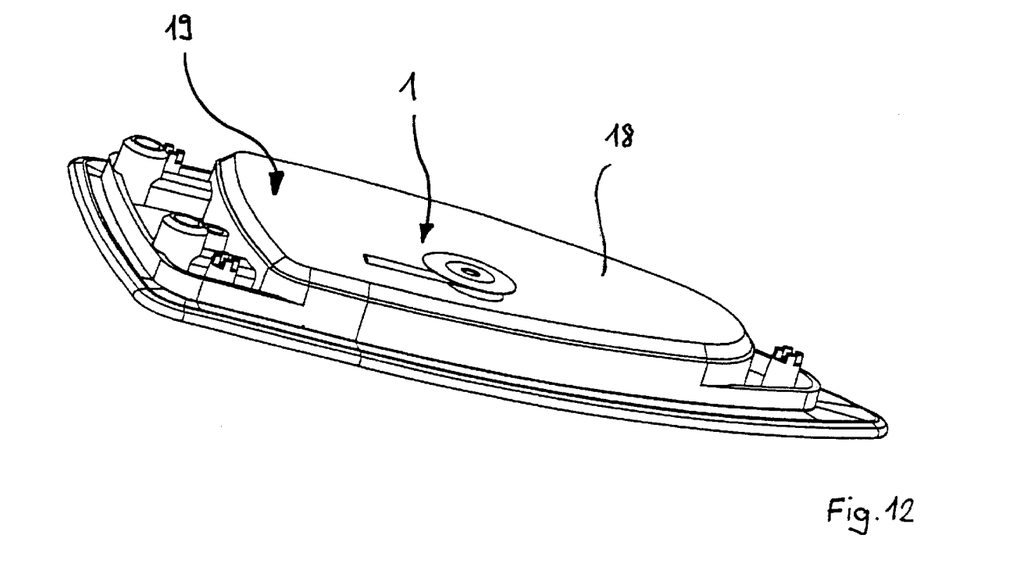
FIG. 12: a perspective representation of the sole of an iron with an alternative embodiment form of an integrated, thermally controlled apparatus
Figure 13:
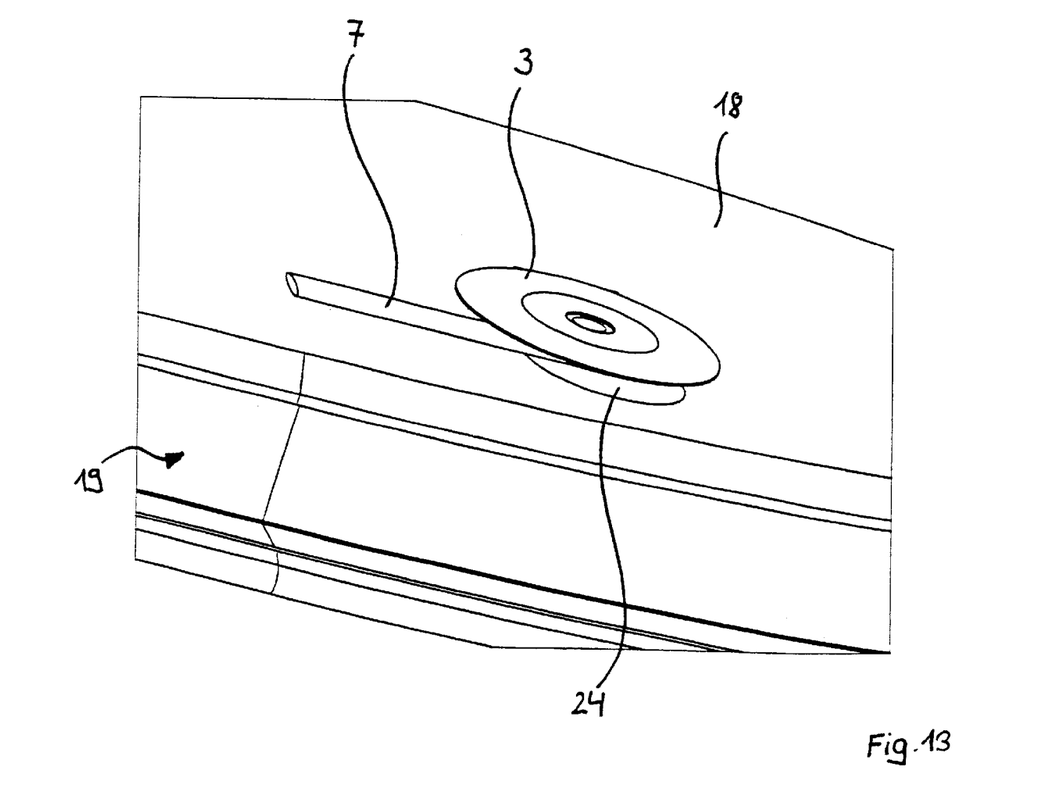
FIG. 13: an enlarged representation of a detail from FIG. 12

In the embodiment according to FIGS. 12 and 13, the carrier element 4 or the top side 18 of the sole 19 of the iron, as the case may be, displays a transition element 24, into which the flow-through element 7 transitions. The flow-through element 7 is formed as a single piece with the transition element 24. The transition element 24 displays further a brace (not represented in the drawn figures) that extends into the steam chamber, which brace is designed for fastening and heat conduction.

The carrier element 4 is designed in a springing manner such that it follows the movement of the bimetallic spring disc 3 over a certain distance. The advantage of this lies in the fact that the closing movement has a longer stroke and the pressing force on the silicone tube is cushioned.

In the embodiment according to FIG. 11, the bimetallic spring disc 3 is arranged so as to be thermally coupled directly to a heat-conducting, dome-like carrier element 25. The carrier element 25 is in direct thermal contact with the heated sole 19 and penetrates the top side 18 of the sole 19.

REFERENCE NUMERALS 1 thermally controlled apparatus
2 valve opening
3 bimetallic spring disc
4 carrier element
5 edge of the bimetallic spring disc
6 cross-sectionally variable segment
7 flow-through element
8 center
9 stamped region
10 circular segments
11 bend
12 edge region
13 upward bend
14 rivet
15 bead
16 fastening cutout
17 rib
18 top side
19 sole
20 support element
21 tube guide element
22 burred side
23 burr-free side
24 transition element
25 carrier element
D thickness

What is claimed is:

1. Thermally controlled apparatus for actuating a drip-stop valve opening in a steam iron, the apparatus having a bimetallic spring disc that is fastened to a carrier element, an edge or edge region of which disc opens or closes the valve opening depending on a curvature position of the bimetallic spring disc, wherein the valve opening is formed by a cross-sectionally variable segment of a tubular or pipe-like flow-through element, and the edge or edge region of the bimetallic spring disc acts directly on the cross-sectionally variable segment by compressing the segment against the carrier element of the spring disc, and wherein at least two closing regions, positioned one behind the other in the flow-through direction, are formed by direct acting of the bimetallic spring disc.

2. Apparatus according to claim 1, wherein the flow-through element is formed by a permanently elastic tube or a permanently elastic molded part.

3. Apparatus according to claim 1, wherein the flow-through element runs between the bimetallic spring disc and the carrier element.

4. Apparatus according to claim 1, wherein the carrier element consists of a carrier plate that runs essentially parallel to the extension plane of the bimetallic spring disc.

5. Apparatus according to claim 1, wherein the carrier element is integrated into a top side of a sole of an iron or of a steam chamber.

6. Apparatus according to claim 1, wherein provision is made for a top side of a sole of an iron or of a steam chamber as the carrier element.

7. Apparatus according claim 1, wherein the bimetallic spring disc has a burred side as well as a burr-free side, and acts on flow-through element with the burr-free side.

8. Apparatus according to claim 1, wherein a center of the bimetallic spring disc is fastened to the carrier element.

9. Apparatus according to claim 1, wherein the center of the bimetallic disc is fastened to an elevated section of the carrier element.

10. Apparatus according to claim 1, wherein the acting on the flow-through element by the edge of the bimetallic spring disc occurs along two circular segments.

11. Apparatus according to claim 10, wherein lines of action run in the manner of an arc.

12. Apparatus according to claim 1, wherein the carrier element includes at least one protruding rib for a direct acting on the cross-sectionally variable segment.

13. Apparatus according to claim 12, wherein the rib is arranged essentially parallel to the edge, which acts on the flow-through element, of the bimetallic spring disc.

14. Apparatus according to claim 11, wherein the rib follows the course of the edge of the bimetallic spring disc.

15. Apparatus according to claim 12, wherein the rib is displaced radially inward relative to the edge of the bimetallic spring disc.

16. Apparatus according to claim 1, wherein the carrier element is bent around the edge of the bimetallic spring disc, and the flow-through element borders on the formed bend of the carrier element.

17. Apparatus according to claim 16, wherein the position of the flow-through element is defined, on the one hand, through the bend, and on the other hand through the elevated section of the carrier element.

18. Apparatus according to claim 1, wherein the flow-through element enters the top side of a sole of an iron or of a steam chamber at least in the region of the cross-sectionally variable segment.

19. Apparatus according to claim 1, wherein the flow-through element lies in a tube guide element at least in the region of the cross-sectionally variable segment.

20. Apparatus according to claim 19, wherein the tube guide element is a trough-like indentation or recess or notch.

21. Apparatus according to claim 19, wherein the tube guide element includes at least one rib for direct acting on the cross-sectionally variable segment.

22. Apparatus according to claim 1, wherein ribs are arranged essentially parallel to the edge, which acts on the flow-through element, of the bimetallic spring disc.

23. Apparatus according to claim 1, wherein the carrier element includes a transition element, into which the flow-through element transitions.

24. Apparatus according to claim 1, wherein the edge region, opposite the flow-through element, of the bimetallic spring disc is supported.

25. Apparatus according to claim 24, wherein the supporting of the edge region takes place through a bending-up of the carrier element.

26. Apparatus according to claim 24, wherein a height of the bending-up corresponds to a thickness of the flow-through element compressed by the edge of the bimetallic spring disc.

27. Apparatus according to claim 1, wherein the top side of the iron sole or steam chamber is provided with a separate or integrated support element for supporting the edge or edge region.

28. Apparatus according to claim 1, wherein the carrier element is designed such that the carrier element follows the movement of the bimetallic spring disc over a certain distance.

29. Apparatus according to claim 1, wherein an elevated section of the carrier element is formed by a stamped area of the carrier element.

30. Apparatus according to claim 29, wherein the center of to stamped area is provided with an integrated bead that grasps through a central fastening cutout of the bimetallic spring disc.

31. Apparatus according to claim 1, wherein the flow-through element is formed by a silicone tube clamped between the carrier element and the bimetallic spring disc.

32. Apparatus according to claim 1, the bimetallic spring disc is arranged so as to be thermally coupled directly to a heat-conducting carrier element.

33. Apparatus according to claim 1, wherein the carrier element forms a heat-conduction plate for the bimetallic spring disc.

34. Apparatus according to claim 33, wherein the carrier element has a dome-like form.

35. Apparatus according to claim 34, wherein the dome-like carrier element bears a support element in a necking.

36. Apparatus according to claim 32, wherein the carrier element is in direct thermal contact with a heated sole or a steam chamber, as the case may be, and penetrates a top side of the sale or the steam chamber.

37. Apparatus according to claim 1, wherein the bimetallic spring disc, in the cold state, is curved against the carrier element and closes off the flow-through element, and in the warm state the spring disc edge curves away from the carrier element, whereby the inner cross section of the flow-through element is at least partially opened.

38. Apparatus according to claim 1, wherein in the opened state the closing positions of the flow-through element have an oval cross section.

* * * * *